United States Patent [19]

Hosoe et al.

[11] Patent Number: 4,716,366
[45] Date of Patent: Dec. 29, 1987

[54] EDDY CURRENT DISTANCE SIGNAL APPARATUS WITH TEMPERATURE CHANGE COMPENSATION MEANS

[75] Inventors: Toshiaki Hosoe, Yokosuka; Seigo Ando, Yokohama; Yoshihiro Kawase, Kawasaki, all of Japan

[73] Assignee: Nippon Kokan K.K., Tokyo, Japan

[21] Appl. No.: 749,941

[22] Filed: Jun. 27, 1985

[30] Foreign Application Priority Data

Jun. 30, 1984 [JP] Japan ............... 59-136311

[51] Int. Cl.$^4$ ............... G01B 7/14; G01F 23/00; G01R 33/12
[52] U.S. Cl. ................... 324/207; 324/225; 324/241; 340/618
[58] Field of Search ............... 324/204, 207, 208, 225, 324/224, 239, 240–243, 329; 73/290 R; 340/618; 336/30, 45

[56] References Cited

U.S. PATENT DOCUMENTS

| 3,371,272 | 2/1968 | Stanton | 324/207 |
| 3,440,532 | 4/1969 | Chung | 324/207 X |
| 3,609,527 | 5/1969 | Ellis | 324/207 |
| 4,000,448 | 12/1976 | Shum et al. | 324/207 X |
| 4,030,027 | 6/1977 | Yamada et al. | 324/207 |
| 4,088,952 | 5/1978 | Sikora | 324/207 |
| 4,283,680 | 8/1981 | Kerr | 324/225 X |
| 4,492,925 | 1/1985 | Kammerer et al. | 324/207 X |
| 4,567,435 | 1/1986 | Yamada et al. | 324/207 |

FOREIGN PATENT DOCUMENTS

| 049304 | 4/1982 | European Pat. Off. . |
| 2722544 | 12/1977 | Fed. Rep. of Germany ...... 324/207 |
| 2290654 | 11/1975 | France . |
| 57-57202 | 6/1982 | Japan . |
| 57-192805 | 11/1982 | Japan . |
| 2054867 | 2/1981 | United Kingdom . |
| 2138145 | 10/1984 | United Kingdom . |

OTHER PUBLICATIONS

Patents Abstracts of Japan, vol. 7, No. 42, (p-177)(1187), 19th Feb. 1983; & JP-A-57 57 192, (Nippon Kokan K.K.), 27-11-1982.
Patents Abstracts of Japan, vol. 6, No. 133, (P-129)(1011), 20th Jul. 1982; & JP-A-57 57 202, (Nippon Kokan K.K.), 06-04-1982.

Primary Examiner—Reinhard J. Eisenzopf
Assistant Examiner—Warren S. Edmonds
Attorney, Agent, or Firm—Frishauf, Holtz, Goodman & Woodward

[57] ABSTRACT

Eddy current distance measuring apparatus includes a multiplier connected to one secondary coil of a pair of secondary coils in an eddy current sensor. The secondary coil outputs are inputted to a differential amplifier, and the resulting difference is adjusted to be zero when an object the distance to which is to be measured is not present. Thereafter, the sensor is located within measuring distance of, e.g., a steel plate, and the output of the differential amplifier is combined by an amplifier circuit with an oscillator output supplying a current to the primary coil of the sensor. An eddy current distance signal output is thus obtained.

9 Claims, 6 Drawing Figures

EDDY CURRENT DISTANCE SIGNAL APPARATUS WITH TEMPERATURE CHANGE COMPENSATION MEANS

BACKGROUND OF THE INVENTION

The present invention relates to an eddy current distance meter and, more particularly, to an eddy current distance signal apparatus with compensating means for compensating for changes in temperature.

A conventional eddy current distance meter is a noncontact distance meter used when an object to be measured is a conductor. An eddy current distance meter has a primary coil and two secondary coils. When one of the secondary coils is located near an object such as a steel plate, an AC signal supplied to the primary coil generates a magnetic field, and an eddy current is generated on the surface of the steel plate. The eddy current causes generation of a magnetic field having magnetization opposite to that of the magnetic field generated by the AC signal. Thus, a voltage at the secondary coil located near the steel plate is lower than that of the other secondary coil, and the voltage difference corresponds to a distance between the eddy current meter and the steel plate.

When the level of a molten metal is to be measured, an eddy current distance meter, having the arrangement described above and being forcibly cooled, is lowered to a position near the surface of the molten metal. However, in practice, the secondary coil located near the molten metal is exposed to a higher temperature than the other secondary coil. As a result, the secondary coil located near the molten metal is thermally expanded and its dimensions change. An induction voltage changes accordingly. Although a change in induction voltage caused by a change in temperature is not very large, a difference between induction voltages at the secondary coils is also small. This voltage difference only slightly changes in accordance with a change in distance. Therefore, the error caused by a change in temperature largely affects the measurement.

In an ideal state, voltages induced at the two secondary coils are, in principle, identical and the difference is zero when an object to be measured is not present. In practice, however, due to the difference between coil diameters of the two secondary coils during the fabrication process, a variation in distance between the primary and secondary coils, and for other reasons, identical voltages cannot be obtained at the two secondary coils. Prior to measurement, the calibration of the meter must be checked to ensure a zero difference between the induction voltages at the secondary coils.

SUMMARY OF THE INVENTION

It is an object of the present invention to provide a high-precision eddy current distance signal formation apparatus, wherein output errors caused by dimensional errors during the fabrication process and changes in temperature during measurement are compensated for, thereby performing accurate distance measurement.

In order to achieve the above object of the present invention, there is provided an eddy current distance signal formation apparatus comprising: an eddy current sensor having a primary coil and two secondary coils; means for supplying an alternating current signal to the primary coil; voltage regulating means, coupled to at least one of the two secondary coils, for regulating a voltage induced at this one of the two secondary coils to be substantially equal to that induced at the other secondary coil; and means for calculating a difference between an output voltage from the voltage regulating means and an output voltage at the other secondary coil.

DETAILED DESCRIPTION OF THE PREFERRED EMBODIMENTS

Figure 1:
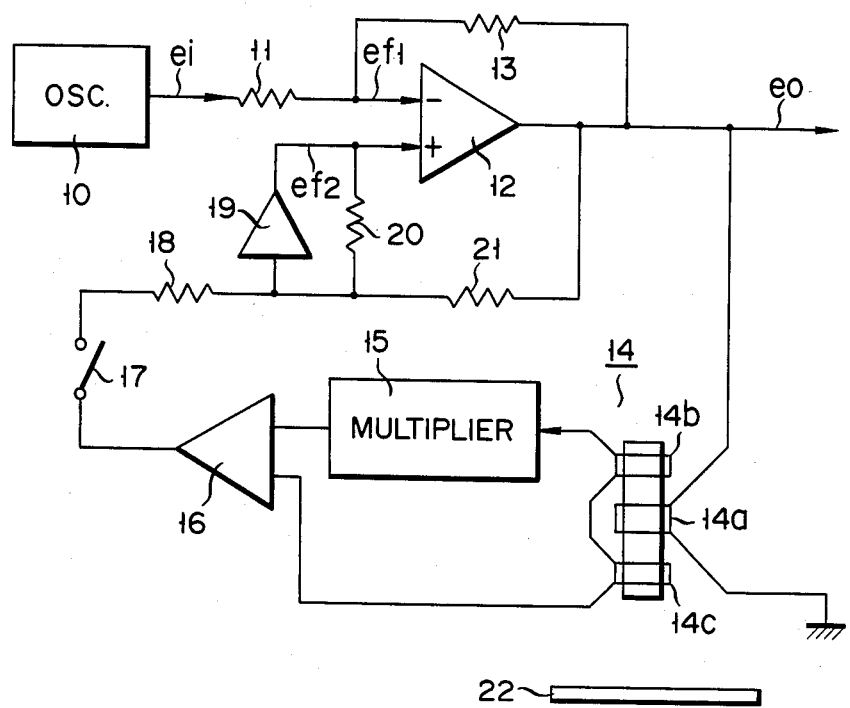
FIG. 1 is a block diagram of an eddy current distance signal formation apparatus according to an embodiment of the present invention.

FIG. 1, an AC voltage ei having predetermined amplitude and frequency is generated from an oscillator 10. The voltage ei is applied to the inverting input terminal of a feedback amplifier 12 through a resistor 11. A feedback resistor 13 is connected between the inverting input terminal of the amplifier 12 and the output terminal thereof. The output terminal of the amplifier 12 is connected to one end of a primary coil 14a of a distance or eddy sensor 14. The other end of the coil 14a is grounded. The sensor 14 further has two secondary coils 14b and 14c. The coils 14b and 14c have the same number of turns and are the same distance from the coil 14a, thus, they generate the same induction voltages in accordance with an AC voltage supplied to the coil 14a when the sensor 14 is not located near an object to be measured. One end of the coil 14b is connected to the input terminal of a multiplier 15, and the output terminal of multiplier 15 is connected to one input terminal of a differential amplifier 16. One end of the coil 14c is directly connected to the other input terminal of the amplifier 16. The other end of the coil 14b is connected to the other end of the coil 14c.

The output terminal of the amplifier 16 is connected to one end of a resistor 18 through a switch 17, and the other end thereof is connected to the input terminal of an adder 19. The output terminal of the adder 19 is connected to the noninverting input terminal of the amplifier 12. One end of each of resistors 20 and 21 is connected to the input terminal of the adder 19. The other end of the resistor 20 is connected to the noninverting input terminal of the amplifier 12. The other end of the resistor 21 is connected to the output terminal of the amplifier 12.

The operation of the eddy current distance signal apparatus having the arrangement described above will be described hereinafter. The sensor 14 is exposed in an atmosphere at a temperature of 20° C. while a steel plate 22 to be measured is not present. In this state, the switch 17 is turned on/off to check a change in the output voltage eO. When an output from the amplifier 16 is zero, the voltage eO will not change upon ON/OFF operation of the switch 17. The output level of the multiplier 15 is equal to that of the coil 14c. However, when the voltage eO is changed, a multiplication factor of the multiplier 15 is adjusted to set the change in voltage eO to be zero even if the switch 17 is turned on/off. This operation ensures the calibration of the apparatus when it is compensated for the dimensional errors during the fabrication process.

The multiplication factor of the multiplier 15 is adjusted as described above to set the output from the amplifier 16 to be zero, the switch 17 is turned on, and the sensor 14 is located near the plate 22. In this case, the temperature of the plate 22 is set such that the temperature of the sensor 14 is set at about 20° C. while being cooled. When an AC voltage is applied to the coil 14a, an AC magnetic field is generated from the coil 14a and reaches the plate 22. An eddy current is generated by the AC magnetic field in the plate 22. The eddy current flow is such that the magnetic field generated thereby has magnetization opposite to that of the AC magnetic field generated by the coil 14a. For this reason, a voltage induced in the coil 14c is altered causing the amplifier 16 to generate an output corresponding to the difference between the induction voltages at the coils 14b and 14c. The output voltage corresponding to the difference voltage is applied to the adder 19 through the switch 17 and supplied to the noninverting input terminal of the amplifier 12. As a result, the voltage eO is changed. The change in the voltage eO corresponds to the distance between the plate 22 and the sensor 14. The voltage eO is applied to an operation circuit (not shown) to obtain necessary distance data. In this manner, since the sensor 14 is calibrated in a 20° C. atmosphere, the distance between the sensor 14 and the plate 22 can be accurately measured without being influenced by a change in temperature.

Next, the sensor 14 is positioned near the plate 22 which is kept at a high temperature. Although all the coils 14a to 14c of the sensor 14 are forcibly cooled, temperature of the coil 14c near the plate 22 becomes higher than that of the coil 14b and is heated to a temperature of 60° C. In this state, when an AC voltage is applied to the coil 14a, an AC magnetic field is generated from the coil 14a. In the same manner as described above, the output voltage eO, corresponding to the distance between the plate 22 and the sensor 14, is generated.

When an input voltage applied to the inverting input terminal of the amplifier 12 is given as ef1, the following equation is established:

$$(ei-ef1)R2 = (ef1-eO)R1 \tag{1}$$

where R1 and R2 are the resistances of the resistors 11 and 13. When addition coefficients of the adder 19, a gain of the amplifier 16, the number of turns of the coil 14a in the sensor 14, the number of turns of each of the coils 14b and 14c, an impedance of the coil 14a, mutual impedances between the coils 14a and 14b and between the coils 14a and 14c, a multiplication factor of the multiplier 15, resistances of the resistors 18, 20 and 21 are given as K1=RN/R3, K2=RN/R4, G1, NP, NS, ZP, k1, k2, $\beta$, R4, RN and R3, respectively, an input voltage (i.e., a positive feedback voltage) applied to the noninverting input terminal of the amplifier 12 is given as follows:

$$ef2 = K1 + K2 \cdot G1\{(NS/NP)(eO/ZP)(k1-k2\beta)\} \tag{2}$$

When a negative feedback ratio is given as N=R2/R1, an output voltage at the amplifier 12 is derived as:

$$eO = -N \cdot ei/[1-[(RN/R4)G2\{(NS/NP)(eO/ZP) \cdot (k1 \cdot \beta - k2)\} \cdot (1+N) + (RN/R3)(1+N)]] \tag{3}$$

In equation (3), when the multiplication factor $\beta$ of the multiplier 15 is adjusted to establish the relation $k1 \cdot \beta - k2 = 0$, the output from the amplifier 16 can be set to be zero irrespective of the impedance ZP of the coil 14a and the mutual impedances k1 and k2. Therefore, a change in the output voltage eO caused by a change in temperature is small, thereby performing accurate distance measurement, irrespective of temperature change.

Figure 2:
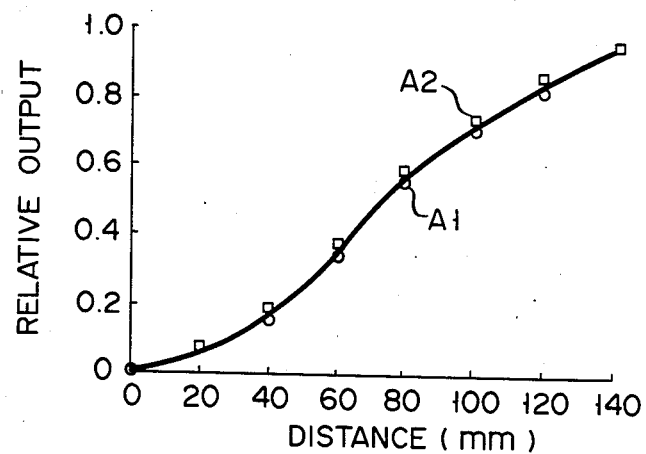
FIG. 2 is a graph showing characteristic curves of distance signals generated from the apparatus of FIG. 1.

FIG. 2 shows characteristic curves A1 and A2 showing the relative outputs as a function of distances at temperatures of 20° C. and 60° C., respectively. As is apparent from FIG. 2, the output characteristics are identical at different temperature changes of 20° C. and 60° C. The characteristic curve of FIG. 2 are obtained when the negative feedback ratio of the amplifier 12 is 0.1 and the gain of the amplifier 16 is 100.

An eddy current distance signal formation apparatus according to a second embodiment of the present invention will be described with reference to FIGS. 3 and 4. In the first embodiment of FIG. 1, the multiplication factor of the multiplier 15 is manually adjusted. However, according to the second embodiment, a multiplication factor of a multiplier is automatically adjusted. The same reference numerals in FIG. 3 denote the same parts as in FIG. 1, and a detailed illustration or description thereof will be omitted.

Figure 3:
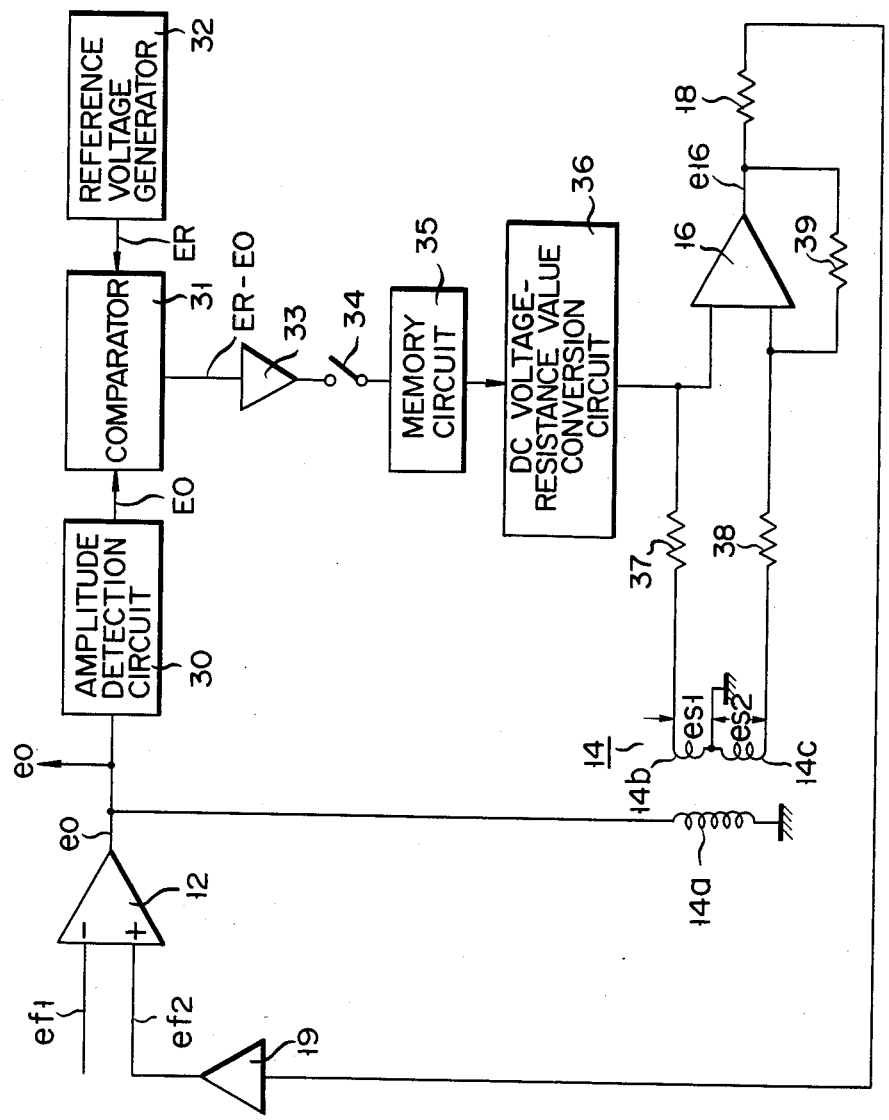
FIG. 3 is a block diagram of an eddy current distance signal formation apparatus according to another embodiment of the present invention.

Referring to FIG. 3, an output eO from a feedback amplifier 12 is supplied to a primary coil 14a of an eddy sensor 14 and the input terminal of an amplitude detection circuit or detector 30. The detector 30 converts an output voltage eO to a DC voltage EO. The voltage EO is applied to one input terminal of a comparator 31. The comparator 31 receives a reference voltage ER from a reference voltage generator 32 at the other input terminal and compares the voltage EO with the voltage ER. The comparator 31 then generates a difference voltage (ER−EO) which is applied to the input terminal of an analog memory circuit 35 through an amplifier 33 and an automatic compensation switch 34. If desired, a digital memory unit may be used for the analog memory 35. The output from the memory circuit 35 is supplied to a DC voltage-resistance value conversion circuit or converter 36. The output terminal of the converter 36 is connected to a common junction between one end of a resistor 37 and one input terminal of a differential amplifier 16.

The other end of the resistor 37 is connected to one end of a secondary coil 14b. One end of the other secondary coil 14c is connected to one end of the resistor 38. The other end of the resistor 38 is connected to the other input terminal of the amplifier 16. A resistor 39 is connected between the other input terminal of the amplifier 16 and the output terminal thereof. The output terminal of the amplifier 16 is connected to the input terminal of an adder 19 through a resistor 18, like the embodiment of FIG. 1.

The converter 36 has an equivalent resistance Re whose resistance corresponds to the input voltage as the difference voltage (ER−EO). For example, a field effect transistor can be used as the DC voltage-resistance value converter. In this case, the gate of the FET is connected to receive the input DC voltage. A multiplier can also be used to constitute a DC voltage-resistance value converter. These circuits will be described later.

The operation of the eddy current distance signal apparatus shown in FIG. 3 will be described hereinafter. The switch 34 is turned on. At this time, the sensor 14 is separated from the object to be measured. The amplitude of the output voltage eO from the amplifier 12 is detected by the detector 30, thereby obtaining a DC voltage EO corresponding to the detected amplitude of the output eO. The DC voltage EO is compared by the comparator 31 with the reference voltage ER. If a difference voltage (ER−EO) is detected, this is amplified by the amplifier 33 to a predetermined level. The amplified signal is stored in the memory circuit 35 through the switch 34. When data is stored in the memory circuit 35, the switch 34 is turned off. The difference voltage (ER−RO) is then read out from the memory circuit 35 and supplied to the DC input terminal of the converter 36. As a result, an output voltage having a predetermined level and generated from the converter 36 is added to an induction voltage es1 at the coil 14b. The sum is supplied to one input terminal of the amplifier 16, and at the same time an output voltage es2 from the coil 14c is supplied to the other input terminal of the amplifier 16. In this case, the reference voltage ER is determined such that the sum of the induction voltage es2 and the output voltage at the converter 36 is equal to the voltage es2. The memory circuit 35 stores the voltage (ER−EO) representing conditions such as an ambient temperature.

When the sensor 14 is located near the object to be measured, a voltage imbalance corresponding to the accurate distance between the sensor 14 and the object can be detected by the amplifier 16 without being influenced by the temperature. The amplifier 16 generates the output e16. If it is desired, every time the temperature of the measurement conditions changes, the switch 34 may be temporarily turned on to perform calibration.

The equivalent resistance Re in the converter 36 is determined in accordance with the output signal eO, so that the output voltage from the adder 19 supplied to the noninverting input terminal of the amplifier 12 is changed. In other words, the voltage supplied to the differential amplifier 16 from the coil 14b is increased/decreased, and the resultant voltage is applied to the noninverting input terminal of the amplifier 12. In a subsequent description, reference symbols R11 to R14 denote resistances of the resistors 37, 38, 39 and 18, respectively.

The output voltage e16 at the amplifier 16 in the eddy current distance signal apparatus having the arrangement described above is obtained as follows:

$$e16 = (R12 + R13)/R12 \times [\{R13/(R12 + R3)\}\{es2 - [R10\{1 - A(ER - EO)\}/[R11 + R10\}1 - A(ER - EO)\}] \cdot es1] \quad (4)$$

where A is a constant of the converter 36 and is normally set to be 0.1 when a multiplier is included in the converter 36.

In equation (4), the following relations are given:

$$es1 = (NS1/NP)(eO/ZP)k1 \cdot \beta$$

$$es2 = (NS2/NP)(eO/ZP)k2$$

With the above arrangement, the resistance Re corresponding to the voltage EO from the amplitude detector 30 is connected to one input terminal of the amplifier 16. Therefore, the voltage es1 generated from the coil 14b is divided by a resistor circuit, including a resistor of a resistance of Re. A divided voltage is applied to the amplifier 16. As a result, the mutual impedance k1 of the coil 14b is equivalently regulated in accordance with the temperature.

Figure 4:
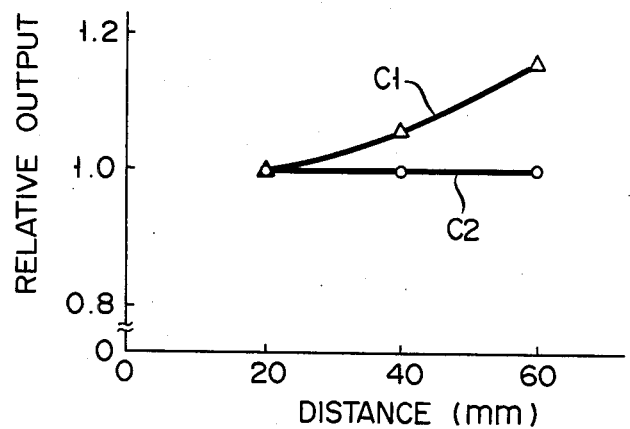
FIG. 4 is a graph showing characteristic curves of distance signals generated from the apparatus of FIG. 3.

FIG. 4 shows an output characteristic curve C1 before correction and an output characteristic curve C2 after correction. The relative output can be kept substantially constant although the distance is changed.

As has been described above, an induction voltage compensating means is provided in at least one of the pair of secondary coils in the sensor 14 so as to compensate for dimensional errors during a fabrication process and an error caused by a change in temperature, so that accurate distance measurement can be performed irrespective of the temperatures of the objects to be measured, thereby providing an eddy current distance signal apparatus with high precision.

There will now be described some examples of concrete circuit arrangements of the DC voltage-resistance value conversion circuit shown in FIG. 3.

Figure 5:
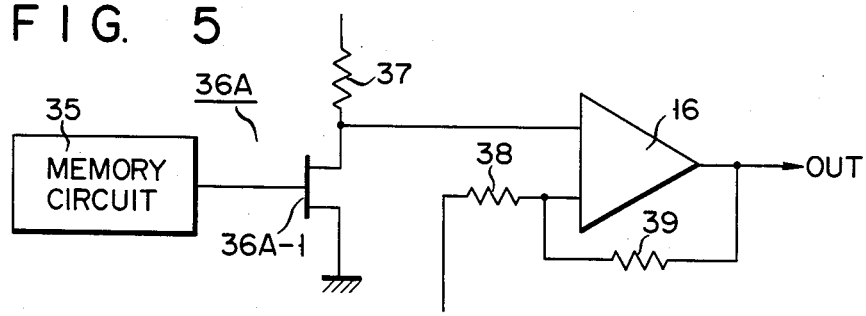
FIG. 5 is a block diagram of a DC voltage resistance value conversion circuit shown in FIG. 3.

FIG. 5 shows an example 36A of the conversion circuit 36 wherein a field effect transistor (FET) 36A-1 is used as a DC voltage-resistance value conversion element. The gate terminal of the FET 36A-1 is connected to an output terminal of the memory circuit 35 shown in FIG. 3 for receiving a DC voltage stored in the memory circuit 35. The drain terminal of the FET 36A-1 is connected to the end of the resistor 37 shown in FIG. 3, while the source terminal thereof is grounded. The node between the drain electrode and the resistor 37 is connected to one input terminal of the differential amplifier 16.

With the circuit arrangement of FIG. 5, when an analog DC voltage is supplied to the gate electrode of FET 36A-1 from the memory circuit 35, the conductance or resistance of the current path between the drain and source of FET 36A-1 is varied in accordance with the applied DC voltage. Thus, a voltage dividing ratio of resistors 36A-1 and 37 is varied, and the resultant regulated voltage of the induced voltage obtained from coil 14b is supplied to one input of the amplifier 16.

Figure 6:
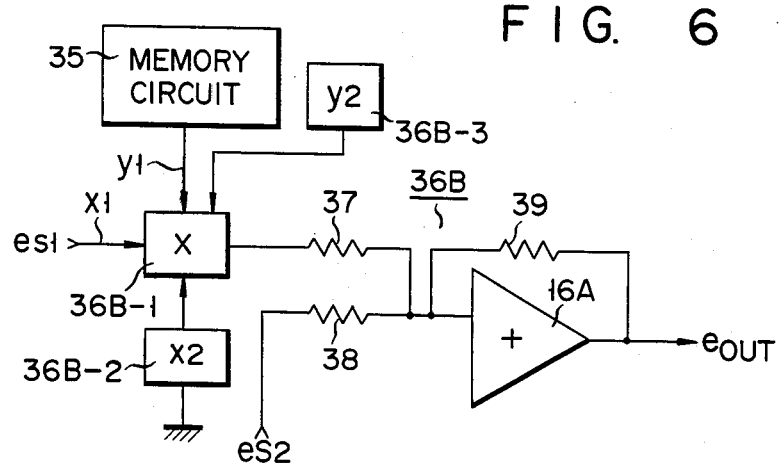
FIG. 6 is a block diagram of another DC voltage resistance value conversion circuit shown in FIG. 3.

FIG. 6 shows another example 36B of the conversion circuit 36. In this example 36B, a multiplier 36B-1 is used. The multiplier 36B-1 has four inputs, x1, x2, y1 and y2 and one output z out. Between four inputs x1 to x4 and output z out is established the following relation:

$$\{(x1 - x2)(y1 - y2)\}/K = z \text{ out} \quad (5)$$

where K is a constant and is usually set as K=10. In the Figure, the induction voltage es1 of the coil 14b is supplied as x1, a voltage generator 36B-2 is connected to supply a voltage as x2, the DC voltage stored in memory circuit 35 is supplied as y1, and a voltage generator 36B-3 is connected to supply a voltage as y2.

The output of the multiplier 36B-1 is connected to one end of the resistor 37 the other end of which is connected to an input of an adder 16A. To the input of the adder 16A, the induction voltage es2 induced at the coil 14C is also supplied through the resistor 38. A resistor 39 is connected between the input and output of the adder 16A.

In the circuit of FIG. 6, the output voltage of the generator 36B-2 is set as x2=0, and the output of the generator 36B-3 is set as $y2=10$. Thus, when an output $y1$ of the memory circuit 35 is zero, the output $z$ out becomes as follows from the equation (5).

$$z\ out = \{es1 \times (-10)\}/10 = es1 \qquad (6)$$

Thus, the multiplier 36B-1 functions as an inverter in this case.

The voltage $-es1$ and $es2$ are supplied to the adder 16A and we obtain an output OUT from the adder 16A as follows.

$$e_{out} = (R13/R11) \cdot (-)es1 + (R11/R12) \cdot es2$$

where, R11, R12, R13 denote resistance of the resistors 37 to 39, respectively, and are set as $R11 = R12 = R13$.

What is claimed is:

1. An eddy current distance signal apparatus for measuring a distance between a sensor of the apparatus and a conductive object, comprising:
    an eddy current sensor having a primary coil for generating an AC magnetic field, and two secondary coils each arranged to have the same distance from the primary coil so that the secondary coils generate the same inductance voltages in response to said AC magnetic field, when the sensor is not located near an object to be measured;
    means for supplying an alternating current signal to said primary coil;
    voltage regulating means coupled to an output terminal of one of said two secondary coils, for adjusting a voltage induced at said one of said two secondary coils to be equal to that induced at the other secondary coil when said sensor is separated from the object to avoid inducement of eddy currents in the object that would otherwise vary the inductance voltage generated by one of said secondary coils; and
    means for calculating a difference voltage corresponding to said distance signal, between an output voltage from said voltage regulating means and an output voltage at said other secondary coil when said sensor is located at a distance to be measured relative to the object whereat the output voltage of one of said secondary coils is varied accordingly to an eddy current magnetic field generated by the object in response to said AC magnetic field;
    wherein said alternating current signal supplying means comprises:
    means for generating the alternating current signal having predetermined amplitude and frequency, and
    feedback amplifier means for adding the alternating current signal and the difference voltage and supplying a sum signal to said primary coil, whereby an output signal indicative of the distance being measured is obtained at an output of said feedback amplifier means.

2. An apparatus according to claim 1, wherein said voltage regulating means includes a multiplier connected to said one of said two secondary coils.

3. An apparatus according to claim 1, wherein said feedback amplifier means comprises:
    an amplifier circuit having an inverting input terminal for receiving the alternating current signal from said generating means, a non-inverting input terminal, an output terminal and means for feeding back a feedback signal obtained at the output terminal to the non-inverting input terminal;
    an adder for adding the feedback signal from said amplifier circuit and the difference voltage, and for supplying a corresponding sum to the non-inverting terminal of said amplifier circuit; and
    a switch for selectively supplying the difference voltage to said adder.

4. An apparatus according to claim 1, wherein said voltage regulating means comprises:
    means for generating a direct current voltage corresponding to the amplitude of the alternating current signal supplied to said primary coil;
    means for generating a reference voltage;
    comparing means for comparing the direct current voltage with the reference voltage to obtain a difference signal;
    means for storing the difference signal;
    a DC voltage-resistance value converter for generating a compensating voltage having a level corresponding to the stored difference signal; and
    means for adding the voltage induced at said one of said two secondary coils and the compensating voltage and supplying a resultant sum to said means for calculating the difference voltage.

5. An apparatus according to claim 4, wherein said DC voltage-resistance value converter comprises a field effect transistor having a gate electrode, a drain electrode and a source electrode, said gate electrode being connected to receive said stored difference signal, and said compensating voltage being generated at said drain electrode.

6. An apparatus according to claim 1, wherein said voltage regulating means comprises:
    means for generating a direct current voltage corresponding to the amplitude of the alternating current signal supplied to said primary coil;
    means for generating a reference voltage;
    comparing means for comparing the direct current voltage with the reference voltage to obtain a difference signal;
    means for storing the difference signal;
    means for generating a compensating voltage having a level corresponding to the stored difference signal, which comprises a multiplier for effecting multiplication of said stored difference signal and said output voltage of one of said two secondary coils; and
    means for adding the voltage induced at said other secondary coil and the compensating voltage so as to supply a resultant sum to said difference voltage calculating means.

7. An eddy current distance signal apparatus for measuring a distance between a sensor of the apparatus and a conductive object, comprising:
    an eddy current sensor having a primary coil for generating an AC magnetic field, and two secondary coils each arranged to have the same distance from the primary coil so that the secondary coils generate the same induction voltages in response to said AC magnetic field, when the sensor is not located near an object to be measured;
    means for supplying an alternating current signal to said primary coil;
    voltage regulating means coupled to at least one of said two secondary coils, for regulating a voltage induced at said one of said two secondary coils to be equal to that induced at the other secondary coil when said sensor is separated from the object to avoid inducement of eddy currents in the object that would otherwise vary the induction voltage generated by one of said secondary coils; and means for calculating a difference voltage corresponding to said distance signal, between an output voltage from said voltage regulating means and an output voltage at said other secondary coil when said sensor is located at a distance to be measured relative to the object whereat the output voltage of one of said secondary coils is varied according to an eddy current magnetic field generated by the object in response to said AC magnetic field;

wherein said alternating current signal supplying means comprises:

means for generating an alternating current signal having predetermined amplitude and frequency; and feedback amplifier means for adding the alternating current signal and the difference voltage, and for supplying a corresponding sum signal to said primary coil; and wherein said voltage regulating means comprises:

means for generating a direct current voltage corresponding to the amplitude of the alternating current signal supplied to said primary coil;

means for generating a reference voltage;

comparing means for comparing the direct current voltage with the reference voltage to obtain a difference signal;

means for storing the difference signal;

a DC voltage-resistance value converter for generating a compensating voltage having a level corresponding to the stored difference signal; and means for adding the voltage induced at said one of said two secondary coils and the compensating voltage, and for supplying a resultant sum to said means for calculating the difference voltage;

whereby an output signal indicative of the distance being measured is obtained at an output of said feedback amplifier means.

8. An apparatus according to claim 7, wherein said DC voltage-resistance value converter comprises a field effect transistor having a gate electrode, a drain electrode and a source electrode, said gate electrode being connected to receive said stored difference signal, and said compensating voltage being generated at said drain electrode.

9. An eddy current distance signal apparatus for measuring a distance between a sensor of the apparatus and a conductive object, comprising:

an eddy current sensor having a primary coil for generating an AC magnetic field, and two secondary coils each arranged to have the same distance from the primary coil so that the secondary coils generate the same induction voltages in response to said AC magnetic field, when the sensor is not located near an object to be measured;

means for supplying an alternating current signal to said primary coil;

voltage regulating means coupled to at least one of said two secondary coils, for regulating a voltage induced at said one of said two secondary coils to be equal to that induced at the other secondary coil when said sensor is separated from the object to avoid inducement of eddy currents in the object that would otherwise vary the induction voltage generated by one of said secondary coils; and means for calculating a difference voltage corresponding to said distance signal, between an output voltage from said voltage regulating means and and an output voltage at said other secondary coil when said sensor is located at a distance to be measured relative to the object whereat the output voltage of one of said secondary coils is varied according to an eddy current magnetic field generated by the object in response to said AC magnetic field;

wherein said alternating current signal supplying means comprises:

means for generating an alternating current signal having predetermined amplitude and frequency; and feedback amplifier means for adding the alternating current signal and the difference voltage, and for supplying a corresponding sum signal to said primary coil; and wherein said voltage regulating means comprises:

means for generating a direct current voltage corresponding to the amplitude of the alternating current signal supplied to said primary coil;

means for generating a reference voltage;

comparing means for comparing the direct current voltage with the reference voltage to obtain a difference signal;

means for storing the difference signal;

means for generating a compensating voltage having a level corresponding to the stored difference signal, which comprises a multiplier for effecting multiplication of said stored difference signal and said output voltage of one of said two secondary coils; and means for adding the voltage induced at said other secondary coil and the compensating voltage so as to supply a resultant sum to said difference voltage calculating means;

whereby an output signal indicative of the distance being measured is obtained at an output of said feedback amplifier means.

* * * * *